(12) United States Patent
Bebiak et al.

(10) Patent No.: US 6,358,546 B1
(45) Date of Patent: Mar. 19, 2002

(54) METHODS FOR CUSTOMIZING PET FOOD

(75) Inventors: David M. Bebiak, Villa Ridge; Sandeep Bhatnagar, Creve Coeur; Timothy Gleason, Ballwin; Cathryn Fritz-Jung, St. Louis; Karl Kettinger, St. Louis; Daryl F. Klas, St. Louis; Bhajmohan Singh, St. Louis; Donald Speck, Festus; Jill Stoll, Webster Groves, all of MO (US)

(73) Assignee: Ralston Purina Company, St. Louis, MO (US)

( * ) Notice: Subject to any disclaimer, the term of this patent is extended or adjusted under 35 U.S.C. 154(b) by 0 days.

(21) Appl. No.: 09/232,916

(22) Filed: Jan. 15, 1999

(51) Int. Cl.⁷ ................................................ A23K 1/00
(52) U.S. Cl. ........................ 426/232; 426/231; 426/2; 426/635; 426/805
(58) Field of Search ............................. 426/2, 635, 805 426/232, 231

(56) References Cited

U.S. PATENT DOCUMENTS

| | | | |
|---|---|---|---|
| 3,626,377 A | 12/1971 | Markley | 705/3 |
| 3,705,695 A | * 12/1972 | Sandor | 241/34 |
| 3,883,672 A | * 5/1975 | Bone et al. | 426/311 |

(List continued on next page.)

OTHER PUBLICATIONS

"Royal Canin Size Dog Food" Internet input pages of program to generate custom recipe, pp. 1–8, 1997.*
"Royal Canin Size Dog Food" Internet pages with additional recipes for med. size dogs, pp. 1–4, 1997.*
Dialog(R) File 149:IAC (SM) Health & Wellness DB(SM) (c) 1998 Info Access Co. All rts. Reserv. "The Individualized Prescriptive Foods Era Has Dawned".
Dialog(R) File 619:Asia Intelligence Wire (c) 1998 Fin. Times Ltd. All rts. Reserv. "Italy: Pet Product Market Overview (½)".
Dialog(R) File 635:Business Dateline(R) (c) 1998 UMI. All rts. Reserv. "The Pet Connection".
Dialog(R) File 16:IAC Promt (R) (c) 1998 Information Access Co. All rts. Reserv. "Cycle Custom Fitness Canned Puppy Food—Real Beef in Gravy; Real Beef, Rice & Vegetables in Gravy; Real Chicken & Rice in Gravy; Adult Canned Dog Food—Real Beef in Gravy; etc.".
Dialog (R) File 148:IAC Trade & Industry Database (c) 1998 Info Access Co. All rts. Reserv. "Nature's Recipe Revolutionizes Pet Nutrition With Group Specific Formulas for Dogs".
Dialog (R) File 47:Magazine Database (TM) (c) 1998 Information Access Co. All rts. Reserv. "Looking Forward to the Profits in Pampering Pets".
http://www.rcci–size.com/Products/bm/mba 1.htm Royal Canin Size—"Medium Breed Formulas for Adult 1 and Adult 2".
wysiwyg://133/http://www.rcci–size.com/ Royal Canin Size Dog Food—"Dog Food With A Sizable Difference".
http://www.tags–alvet.com/royalcanine.htm "Royal Canin Is Clearly Willing To Be THE Reference In The Field Of Dry Dog And Cat Food, In Quality Of The Products As Well As In In Its Services".

*Primary Examiner*—Nina Bhat
(74) *Attorney, Agent, or Firm*—Armstrong Teasdale LLP

(57) ABSTRACT

Methods for customizing pet food for an individual pet are described. The method includes the steps of obtaining user input through an electronic user interface, processing the input with stored data on a main computer which is coupled to the user interface, and generating control signals to control the operation of food manufacturing and packaging apparatus according to the user input. The user input is used to form an individual pet profile, which is used to generate a customized pet food formula. The customized pet food formula is then used in the control of the manufacture and packaging of the customized pet food.

48 Claims, 1 Drawing Sheet

U.S. PATENT DOCUMENTS

| | | | |
|---|---|---|---|
| 3,930,031 A | | 12/1975 | Kealy .......................... 426/89 |
| 4,022,915 A | * | 5/1977 | Zukerman .................... 426/72 |
| 4,087,556 A | * | 5/1978 | Harte ........................... 426/2 |
| 4,191,781 A | * | 3/1980 | Schara et al. ................. 426/2 |
| 4,282,254 A | * | 8/1981 | Franzen et al. ............... 426/2 |
| 4,283,400 A | | 8/1981 | von Bittera et al. ........ 514/250 |
| 4,493,290 A | * | 1/1985 | Gibbard .................... 119/51 R |
| 4,665,099 A | | 5/1987 | Ramallo et al. ............ 514/763 |
| 4,772,476 A | * | 9/1988 | Kealy et al. ................... 426/2 |
| 4,871,552 A | * | 10/1989 | Bragdon et al. .............. 426/2 |
| 4,891,756 A | | 1/1990 | Williams, III .............. 708/132 |
| 4,892,748 A | | 1/1990 | Andersen et al. ........... 426/635 |
| 4,954,954 A | | 9/1990 | Madsen et al. ............. 600/300 |
| 5,006,357 A | | 4/1991 | Bert ........................... 426/413 |
| 5,008,821 A | * | 4/1991 | Pratt et al. ............. 364/413.01 |
| 5,030,458 A | * | 7/1991 | Shug et al. .................... 426/2 |
| 5,158,791 A | | 10/1992 | Nocek et al. ............... 426/231 |
| 5,186,964 A | | 2/1993 | Gierhart et al. ............... 426/74 |
| 5,233,520 A | | 8/1993 | Kretsch et al. ............. 600/300 |
| 5,299,529 A | | 4/1994 | Ramirez .................. 119/51.11 |
| 5,315,505 A | * | 5/1994 | Pratt et al. ............. 364/413.01 |
| 5,340,211 A | * | 8/1994 | Pratt .......................... 366/141 |
| 5,355,833 A | * | 10/1994 | Legrain .................. 119/51.02 |
| 5,431,927 A | * | 7/1995 | Hand et al. .................... 426/2 |
| 5,456,934 A | * | 10/1995 | Lee et al. ................... 426/549 |
| 5,478,989 A | | 12/1995 | Shepley ...................... 235/375 |
| 5,504,589 A | | 4/1996 | Montague et al. .......... 358/403 |
| 5,552,176 A | | 9/1996 | Marino ....................... 426/641 |
| 5,656,312 A | | 8/1997 | Erasmus et al. ............. 426/89 |
| 5,672,366 A | | 9/1997 | Petersen ........................ 426/2 |
| 5,704,350 A | | 1/1998 | Williams, III ............... 600/300 |
| 5,729,479 A | | 3/1998 | Golan ........................ 708/132 |
| 5,756,088 A | * | 5/1998 | Matsuura et al. .......... 426/93.4 |
| 5,939,974 A | * | 8/1999 | Heagle et al. ......... 340/286.09 |

* cited by examiner

METHODS FOR CUSTOMIZING PET FOOD

BACKGROUND OF THE INVENTION

This invention relates generally to methods for manufacturing pet foods, and more particularly, to a process for manufacturing a pet food customized to the health and nutrition requirements of an individual pet. Due to economies of scale, retail pet food manufacturers typically manufacture their pet foods in large quantities and a limited number of formulations. Most manufacturers offer, for example, dog food in several flavors, and in a puppy formula, an adult dog formula, and a mature or inactive dog formula. Some manufacturers offer breed-specific or size-specific formulas. Some manufacturers offer more specialized formulas for dogs having specific food allergies or nutrient responsive diseases. Similarly, retail cat food is typically offered in limited variety of formulas of different flavors or for different stages of development. However, the range of pet food choices does not meet the much more highly variable preferences and dietary requirements of individual pets. For example, an individual pet may have specific dietary requirements because of an existing illness or disease, or because of a genetic predisposition towards a disease. In addition to nutritional requirements, pet owners and pets have preferences regarding the form, flavor, shape and texture of the food. Further, the existing variety of pet food choices typically available at, for example, retail outlets, makes it difficult for pet owners to choose the food which most closely meets their own pet's nutrient needs while also satisfying their own preferences. In addition, once a food is chosen, knowing how to feed it correctly can be difficult.

Accordingly, it would be desirable to provide a method of manufacturing a pet food for an individual pet. In addition, it would be desirable to provide the pet owner with specific pet feeding and care information regarding their pet.

BRIEF SUMMARY OF THE INVENTION

Thus there is a particular need for a method for customizing pet food to the health and nutritional requirements of an individual pet. Generally, the method includes the steps of obtaining information about a pet through an electronic user interface, processing the information at a main computer, and generating control signals which control automatic pet food manufacturing apparatus in the manufacture of a pet food according to the information provided by the user.

The methods for customizing pet food allow the manufacturing of a pet food which is customized to the nutritional requirements of an individual pet. The customized pet food is tailored to individual characteristics of the pet, which can include species, breed, age, gender, weight, and additional genetic and health information. Further, the pet food can be customized to the individual preferences of the pet and pet owner regarding flavor, texture and form. In addition, the methods provide the customized pet food on demand of the user, in an amount convenient for the user to transport and store. Along with the customized pet food, the methods further provide specific pet feeding and care recommendations, including the rationale behind the customized formula of the pet food, and recommendations regarding the use of treats and supplements, exercise and veterinary care.

DETAILED DESCRIPTION OF THE INVENTION

Figure 1:
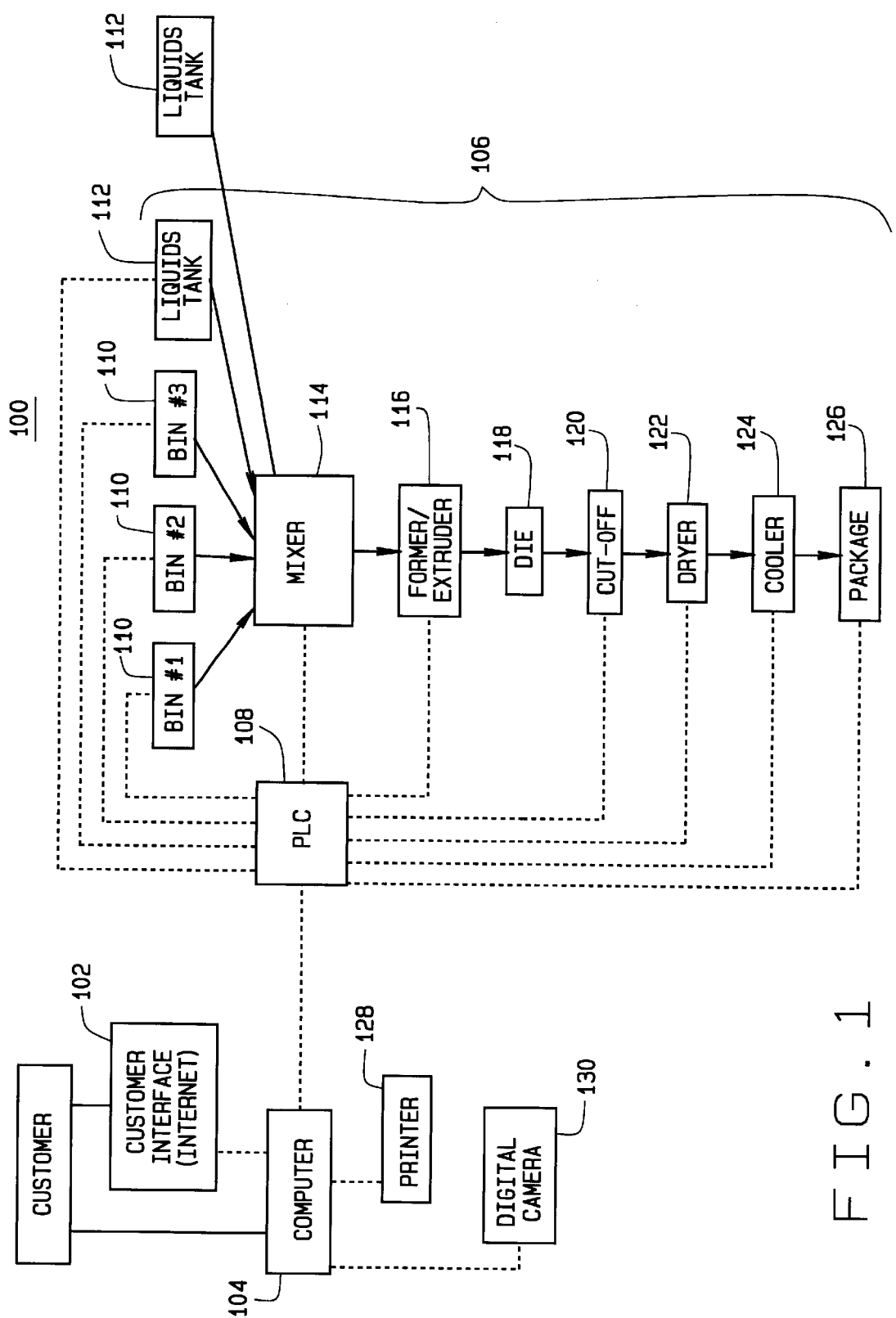
FIG. 1 is a schematic illustration of apparatus for implementing a method for customizing pet food.

FIG. 1 is a schematic illustration of an exemplary embodiment of apparatus 100 for implementing a method of customizing pet food. In one embodiment, the method generally includes the steps of obtaining user input through an electronic user interface 102, processing the input with stored data on a main computer 104 which is electronically coupled to user interface 102, and generating control signals to control the operation of food manufacturing and packaging apparatus 106 according to the user input, where the user input represents an individual pet profile. The individual pet profile includes nutritional and health information on a pet, and individual preferences of the pet and pet owner regarding finished product characteristics such as flavor, form, texture and the like.

It should be understood that, to the extent the present application is directed to the methods as described below in more detail, such methods should not be limited to a particular food manufacturing apparatus. It should be further understood that the methods described herein can be implemented in a variety of ways, including the use of software which runs on main computer 104 and controls the real-time manufacturing of the pet food.

More specifically, user interface 102 may be either remote from, or local relative to main computer 104, and includes a data entry system such as a desktop computer, or an input device such as a keyboard, touch screen, or card reader, and an output device such as a monitor. In another embodiment, user interface 102 is a voice-activated telephone system. User interface 102 is coupled to main computer 104 through standard computer cables, a phone line or a dedicated computer network cable, which transmits the user input to main computer 104 for processing. For example, a user such as a consumer may connect to main computer 104 via a computer network such as the Internet, from a home computer hooked up to a home phone line. Alternatively, the user may use a user interface local relative to main computer 104, both main computer 104 and user interface 102 located, for example, in a retail grocery store. It should be recognized however that the methods are not limited to practice through electronic user interfaces and electronic control systems. In alternative embodiments, the methods include the steps of simply obtaining a user input to form an individual pet profile as described above, using the individual pet profile to generate a customized pet food formula, and manufacturing a customized pet food according to the customized pet food formula. For example, the methods may be practiced by administering a written or verbal questionnaire to a user or customer to form the individual pet profile, using the individual pet profile to generate a customized pet food formula, and manufacturing the customized pet food with manual control of the operation of food manufacturing and packaging apparatus 106.

Main computer 104 may be, for example, a typical, commercially available personal computer with networking capability. Main computer 104 provides an electronic input to user interface 102, which input prompts a user at user interface 102 to answer a series of questions to form an individual pet profile of the pet. The answers from the user are communicated electronically to main computer 104, and then main computer 104 processes the information contained in the individual pet profile and generates control signals for controlling pet food manufacturing apparatus 108. In one embodiment, for example, main computer 104 is a computer network server such as a web server which supports a web "page" written in Hyper-text Mark-up Language (HTML) or web site including multiple such "pages". The web page or web site is the electronic input to the user interface 102, and the user can click on radio buttons on the web pages to answer questions regarding the individual pet profile.

The electronic input from main computer 104 to user interface 102 includes questions regarding a pet's species, age, weight, gender, breed, activity level, breeding status, medical history and genetic information, current health status, and the like. In addition, the electronic input can include, for example, the preferences of the pet, or the pet's owner, regarding form, flavor, shape and texture. The user may also be prompted to provide the time of year, or main computer 104 may provide the time of year according to an internal clock. Together this information forms the individual pet profile. In one embodiment, the user is a consumer such as a pet owner. In an alternative method, the user is a pet care provider such as a veterinarian or veterinary technician who administers a written questionnaire to the pet owner, and then enters the data into user interface 102, or directly into main computer 104.

Main computer 104 receives and processes the information contained in the individual pet profile and generates control signals which control the operation of apparatus 108. More specifically, main computer 104 includes a database which stores nutritional information, which is combined with the individual pet profile to generate a customized pet food formula. Main computer 104 then generates the control signals for apparatus 108 according to the customized pet food formula. In addition, main computer 104 can be programmed to assemble the user input and nutritional data into printed material. In an exemplary embodiment, the printed material includes customized pet feeding and care information for the individual pet, along with an ingredient statement, guaranteed analysis of the pet food, and a product label. In alternative embodiments, the printed material may also include recommendations regarding the use of treats and supplements, exercise of the pet, and veterinary care. Additionally, main computer 104 can be programmed to manage ingredient and supplies inventories, and to generate customer notices or reminders for food re-orders, pet birthday cards, veterinary visits, and special promotions.

In one embodiment, main computer 104 generates the control signals for apparatus 106 through a programmable logic control (PLC) 108. PLC 108 may be a stand alone unit or may be integrated with main computer 104. In one embodiment, PLC 108 is a stand alone unit such as a Modicon model 984-E245 controller, available from Schneider Automation, Inc., North Andover, Mass. However, it should be understood to those skilled in the art that PLC 108 may be any of a variety of commonly known and available programmable circuits, and the methods are not limited to practice only in connection with those integrated circuits referred to in the art as programmable logic controllers. Therefore, and as used herein, the term programmable logic control refers to microprocessors, microcontrollers, application-specific integrated circuits, and other programmable circuits. In addition, to the extent the present application is directed to the methods as described below in more detail, it should be understood that such methods should not be limited to a particular food manufacturing apparatus 106.

PLC 108 is programmed to receive an input signal from main computer 104, and to produce output control signals to food manufacturing apparatus 106. The input signal from main computer 104 represents the customized pet food formula as determined according to the individual pet profile of the pet and nutritional data stored in the database. The output control signals represent a set of manufacturing instructions to food manufacturing apparatus 106, which is capable of operating automatically upon the output control signal from PLC 108. For example, the output signals include start, stop and timing directions to the various components of manufacturing apparatus 106 as described below, and generally controls and directs the manufacture of the pet food by apparatus 106. PLC 108 is further programmed to receive feedback signals from manufacturing apparatus 106, including signals confirming that proper types and amounts of ingredients have been added to the pet food, and signals of equipment malfunctions. PLC 108 may further be coupled to alarms which are activated by malfunction signals from manufacturing apparatus 106.

In one embodiment, food manufacturing apparatus 106 is a unit which is scaled so that it can be placed on a dolly, cart or the like and transported through typical commercial or industrial doorways. Apparatus 106 is powered by a 110V and a 208V source from electrical outlets. The unit can include water hook-ups to facilitate cleaning of the unit, and generally the unit's capacity can be scaled according to the requirements of the facility which houses the unit. For example, a veterinary office may prefer a smaller unit, while a large retail grocery store, or any retailer located remotely from an ingredient supplier, may prefer a larger unit so that refills are required less frequently. Apparatus 106 generally includes a plurality of dry ingredient bins 110 for storing dry, pre-cooked or uncooked pet food ingredients, at least one liquids tank 112, a mixer 114, a former/extruder 116, a die 118, a cut-off device 120, a dryer 122, a cooler 124, and a packager 126.

For example, bins 110 are placed side by side atop the remaining components of apparatus 106, and each bin has an opening at the bottom which is covered by a volume-regulating element, such as a rotary lock, which can be opened and closed by signals from PLC 108, to regulate the gravity-fed, measured addition of dry ingredients to the pet food. Bins 110 may store any of various dry materials typically used in manufacturing pet foods, such as, for example, corn, wheat, corn gluten meal, meat meal, and poultry meal, or precooked mixes of typical ingredients. Bins 110 can be fabricated of transparent material so that the user can observe the dry ingredients as they are added to the pet food. In one embodiment, bins 110 are sealed to protect against infestation.

In an exemplary embodiment, a plurality of liquids tanks 112 are provided for storing and measuring liquid ingredients, such as, for example, fat, tallow, water or liquid animal digest. Heating devices (not shown) may be coupled to the liquids tank to prevent solidification of some liquid ingredients such as fat and tallow. Liquids tanks 112 and bins 110 are coupled to mixer 114 and deliver the dry ingredients and liquids to mixer 114. Mixer 114 can be, for example, a rotating blade mixer as known in the art. In one embodiment, liquids tanks 112 contain pumps (not shown) which are controlled by the output signals from PLC 108, so that liquids tanks 112 deliver measured amounts of liquid ingredients to mixer 114. Subject to the control signals from PLC 108, mixer 114 mixes the dry and liquid ingredients together in preparation for extrusion. For example, the control signals from PLC 108 can regulate the speed of rotating blades, and the duration of the mixing step. A weighing system (not shown) coupled to mixer 114 provides weight information to confirm the amounts of ingredients as they are added. Mixer 114 includes a feeding device (not shown) to deliver the mixed ingredients to former/extruder 116.

Former/extruder 116 can be any former or extruder as well known in the art which develops pressure with or without heat to process and shape the mixed ingredients. For example, former/extruder 116 can be a twin screw cold-forming extruder. Former/extruder 116 is coupled to a die 118 through which the processed ingredients are forced, under conditions of elevated pressure, to form a continuous strand or rope of product. Die 118 is a restricted opening which may be variously configured to determine the final shape and size of the food product. For example, die 118 may be a circular or square shape, an X-shape, a donut-shape, or a fish-shape. The strand is segmented into discrete particles, pieces or kibbles (hereinafter referred to as kibbles) by cut-off device 120, such as a rotating cutting knife, as the product is extruded The kibbles are then conveyed by a bulk conveyor (not shown), such as a conveyor belt, which extends through dryer 122 and cooler 124. In one embodiment, dryer 122 is a standard pizza oven. The speed of the conveyor is controlled by PLC 108, according to user input, to adjust the drying time so that a desired moisture level is obtained. More specifically, the desired moisture level, which is generally about 5% to about 15% for dry pet food, and about 15% to about 40% for semi-moist pet food, is achieved by selecting an internal temperature for dryer 122 and then controlling the dwell time of the kibbles in dryer 122 by adjusting the speed of the conveyor. For example, for a user who has indicated a preference for a semi-moist pet food product, PLC 108 controls the speed of the conveyor so that the dwell time of the dry kibbles in dryer 122 is less than about 1 minute. For a dryer pet food product, as per the user preference, PLC 108 controls the speed of the conveyor so that the dwell time of the kibbles in dryer 122 is about 5 to about 15 minutes. Generally, the drying step renders the product less susceptible to spoilage than if the product was left with the higher moisture level required for the extrusion step. The drying step may be followed by a spraying or coating step in which a coating system is used to apply fats, oils or other liquids or powders onto the product.

After the drying step, and subject to the control signals from PLC 108, the hot kibbles are then transferred by the bulk conveyor to cooler 124, to reduce the product temperature. Cooler 124 can be, for example, an enclosure coupled to dryer 122, which enclosure houses multiple fans. Again, the signals from PLC 108 to the bulk conveyor control the dwell time of the kibbles in cooler 124, and also control operation of the fans. During the dwell time within cooler 124, the kibbles are cooled to a temperature between about ambient temperature and about 120° F. by the air flow provided by the fans. In one embodiment, the kibbles are cooled to about 100° F. Generally, this step is included before packaging to prevent further condensation inside the package, which forms wet spots on the package and increases the chances of product spoilage.

The dry, cooled kibbles are then conveyed by the bulk conveyor through packaging apparatus 126 for packaging in a sealable container such as a plastic or plastic-lined paper bag, box, bottle or jar, which provides protection during storage from moisture gain or loss, and infestation, and also provides a way to identify and label the product. Packaging apparatus 126 may be, for example, a shroud or feed tube attached to cooler 126. PLC 108 controls the movement of conveyor through cooler 124 so that after the cooling step, the conveyor delivers the dried, cooled kibbles to the mouth of the shroud or feed tube, from which the kibbles discharge due the force of gravity. In use, the container is placed under or near the shroud or feed tube so that the container collects the kibbles as they are discharged.

In an exemplary embodiment, main computer 104 is also coupled to a printer 128 which can print labels, such as self-adhesive labels, which can be affixed to the food container. The label, for example, identifies the individual pet for which the food was manufactured, and lists the product formula, ingredient list, date of manufacture, and the like. In an alternative embodiment, main computer 104 is further coupled to a digital camera 130 which captures an electronic image of the individual pet, and transmits the image to main computer 104 to generate a photo label of the pet for the food package, which is printed by printer 128 on a label as described above. Printer 128 may also be used to produce printed material such as a pamphlet or flyer having pet care information and instructions including, for example, a description of the customized pet food formula; feeding recommendations including specific recommendations regarding amount, and feeding methods; recommendations for treats and supplements; and recommendations on veterinary care.

The methods for customizing pet food provide a way for pet food manufacturers to address the individualized health and nutrition requirements, and preferences, of individual pets and their owners. For example, the customized pet food can be tailored to provide a desired nutritional balance for a pet of a specific age, gender and weight, at a particular time of year, and having a specific health problem, such as, for example, a food allergy. In one embodiment, applications of the methods to electronic telecommunications and data processing devices mean that pet food manufacturers can provide customized pet food to users located at a wide variety of facilities or locations, including for example, homes, veterinary offices, retail grocers and retail pet stores. The customized pet food can be delivered to the user at the site of manufacture, or manufactured at a site remote from the user and shipped or mailed to the user.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for customizing a pet food for a pet, said method comprising the steps of:
   through an electronic customer interface, obtaining a user input from a user, wherein the user input comprises an individual pet profile for the pet;
   electronically processing the user input individual pet profile to generate a pet food formula customized according to the user input individual pet profile; and
   manufacturing a customized pet food according to the customized pet food formula.

2. The method in accordance with claim 1 wherein manufacturing a customized pet food comprises the step of generating control signals to control the operation of food manufacturing apparatus according to the user input.

3. The method in accordance with claim 1 further comprising the step of prompting the user to provide the user input through the electronic customer interface.

4. The method in accordance with claim 3 wherein prompting the user to provide the user input comprises the step of asking the user a plurality of questions regarding individual characteristics of the pet.

5. The method in accordance with claim 3 wherein prompting the user to provide the user input comprises the step of asking the user a plurality of questions regarding preferences of an owner of the pet.

6. The method in accordance with claim 3 wherein prompting the user to provide the user input comprises the step of providing an electronic input to the user interface.

7. The method in accordance with claim 3 wherein prompting the user to provide the user input comprises the step of prompting the user to provide species of the pet.

8. The method in accordance with claim 3 wherein prompting the user to provide the user input comprises the step of prompting the user to provide an age of the pet.

9. The method in accordance with claim 3 wherein prompting the user to provide the user input comprises the step of prompting the user to provide a weight of the pet.

10. The method in accordance with claim 3 wherein prompting the user to provide the user input comprises the step of prompting the user to provide a gender of the pet.

11. The method in accordance with claim 3 wherein prompting the user to provide the user input comprises the step of prompting the user to provide a breed of the pet.

12. The method in accordance with claim 3 wherein prompting the user to provide the user input comprises the step of prompting the user to provide a breeding status of the pet.

13. The method in accordance with claim 3 wherein prompting the user to provide the user input comprises the step of prompting the user to provide an activity level of the pet.

14. The method in accordance with claim 3 wherein prompting the user to provide the user input comprises the step of prompting the user to provide a season during which the pet will be eating the pet food.

15. The method in accordance with claim 3 wherein prompting the user to provide the user input comprises the step of prompting the user to provide a medical history of the pet.

16. The method in accordance with claim 3 wherein prompting the user to provide the user input comprises the step of prompting the user to provide genetic information on the pet.

17. The method in accordance with claim 3 wherein prompting the user to provide the user input comprises the step of prompting the user to provide a current health status of the pet.

18. The method in accordance with claim 3 wherein prompting the user to provide the user input comprises the step of prompting the user to provide food flavor preferences.

19. The method in accordance with claim 3 wherein prompting the user to provide the user input comprises the step of prompting the user to provide food texture preferences.

20. The method in accordance with claim 19 wherein prompting the user to provide food texture preferences comprises prompting the user to provide preferences regarding a moisture level of the pet food.

21. The method in accordance with claim 3 wherein prompting the user to provide the user input comprises the step of prompting the user to provide food form preferences.

22. The method in accordance with claim 21 wherein prompting the user to provide food form preferences comprises prompting the user to provide preferences regarding a shape of pieces the pet food.

23. The method in accordance with claim 21 wherein prompting the user to provide food form preferences comprises prompting the user to provide preferences regarding a size of pieces of the pet food.

24. The method in accordance with claim 1 wherein electronically processing the user input to generate a customized pet food formula comprises the step of combining the user input with nutritional data stored in an electronic database.

25. The method in accordance with claim 2 wherein generating control signals to control the operation of the food manufacturing apparatus comprises the step of utilizing the generated customized pet food formula to generate a set of electronic manufacturing instructions for the food manufacturing apparatus.

26. The method in accordance with claim 25 further comprising the step of automatically manufacturing the pet food according to the set of generated electronic manufacturing instructions.

27. The method in accordance with claim 24 further comprising the steps of:
   utilizing the input individual pet profile to assemble the user input and nutritional data into printed material; and
   packaging the pet food in a customized container.

28. The method in accordance with claim 27 wherein assembling the user input pet profile and nutritional data into printed material comprises the step of providing a customized pet food label specific for the pet.

29. The method in accordance with claim 28 wherein providing a customized pet food label includes providing an electronic image of the pet.

30. The method in accordance with claim 28 wherein providing a customized pet food label includes providing a listing of the pet food ingredients.

31. The method in accordance with claim 28 wherein providing a customized pet food label includes the step of utilizing the input individual pet profile information to provide customized feeding instructions for the pet.

32. The method in accordance with claim 27 further comprising the step of utilizing the input individual pet profile information to provide customized pet care instructions.

33. A method for customizing a pet food for a pet, said method comprising the steps of:
   receiving a user input through an electronic user interface, wherein the user input is obtained from a user and comprises individual information for the pet;
   utilizing the input information to generate a pet food formula customized according to the user input individual pet information; and
   manufacturing a customized pet food according to the customized pet food formula generated from the user input information.

34. The method in accordance with claim 33 wherein said step of receiving a user input comprises the step of receiving individual health information for the pet.

35. The method in accordance with claim 33 wherein said step of receiving a user input comprises the step of receiving individual genetic information for the pet.

36. The method in accordance with claim 33 wherein said step of receiving a user input comprises the step of receiving a species of the pet.

37. The method in accordance with claim 33 wherein said step of receiving a user input comprises the step of receiving an activity level of the pet.

38. The method in accordance with claim 33 wherein said step of receiving a user input comprises the step of receiving a medical history of the pet.

39. The method in accordance with claim 33 wherein said step of receiving a user input comprises the step of receiving a breed of the pet.

40. The method in accordance with claim 33 wherein said step of receiving a user input comprises the step of receiving a gender of the pet.

41. The method in accordance with claim 33 wherein said step of receiving a user input comprises the step of receiving a breeding status of the pet.

42. The method in accordance with claim 33 wherein said step of receiving a user input comprises the step of receiving an age of the pet.

43. The method in accordance with claim 33 wherein said step of receiving a user input comprises the step of receiving a weight of the pet.

44. The method in accordance with claim 33 wherein said step of receiving a user input comprises the step of receiving an individual food preference of the pet.

45. The method in accordance with claim 33 wherein said step of receiving a user input comprises the step of receiving an individual food preference of an owner of the pet.

46. The method in accordance with claim 33 wherein said step of receiving a user input further comprises the step of receiving a season during which the pet will be eating the pet food.

47. The method in accordance with claim 33 wherein said step of utilizing the input information comprises the step of electronically processing the individual information for the pet.

48. The method in accordance with claim 33 wherein said step of manufacturing a customized pet food comprises the step of generating electronic control signals to control the operation of food manufacturing apparatus according to the customized pet food formula.

* * * * *